United States Patent [19]

Vagliani et al.

[11] 4,005,274

[45] Jan. 25, 1977

[54] PULSE-CODE MODULATION COMMUNICATION SYSTEM

[75] Inventors: Federico Vagliani, Milan; Alicide Molinari, Vimercate, both of Italy

[73] Assignee: TELETTRA-Laboratori di Telefonia Elettronica e Radio S.p.A., Milan, Italy

[22] Filed: May 27, 1975

[21] Appl. No.: 580,914

[30] Foreign Application Priority Data

May 27, 1974 Italy .................................. 23193/74

[52] U.S. Cl. ..................... 179/15.55 R; 179/15 AP; 179/15 BW
[51] Int. Cl.² ....................... H04J 3/18; H04B 1/66
[58] Field of Search ............ 179/15.55 R, 15.55 T, 179/15 BW, 15 AP, 15 A, 1.5 C, 15 BA; 325/38 B; 340/347 AD

[56] References Cited

UNITED STATES PATENTS

| | | | |
|---|---|---|---|
| 3,471,648 | 10/1969 | Miller | 179/15.55 R |
| 3,711,650 | 1/1973 | Kuhn | 179/15 BW |
| 3,806,806 | 4/1974 | Brolin | 325/38 B |
| 3,815,124 | 6/1974 | Brewer | 340/347 AD |

Primary Examiner—David L. Stewart
Attorney, Agent, or Firm—Hubbell, Cohen, Stiefel & Gross

[57] ABSTRACT

A pulse-code modulation transmission system having reduced redundancy and high transmission quality utilizes a variable companding law and variable number of bits per sample both of which vary in accordance with the type and/or short-time volume of the signal associated with a particular talker as well as with the type and/or short-time volume of all of the signals associated with all of the talkers handled by the transmission system. The system utilizes the envelope or modulating signal for the speech signal to provide a companding law which varies as the talker varies and, for a particular talker, as the short-time volume of that talker varies, so that redundancy can be reduced without impairing transmission quality. This companding law adapts itself to the vowels, consonants and syllables of the word in accordance with their volume in order to optimize the signal to quantizing noise ratio.

14 Claims, 9 Drawing Figures

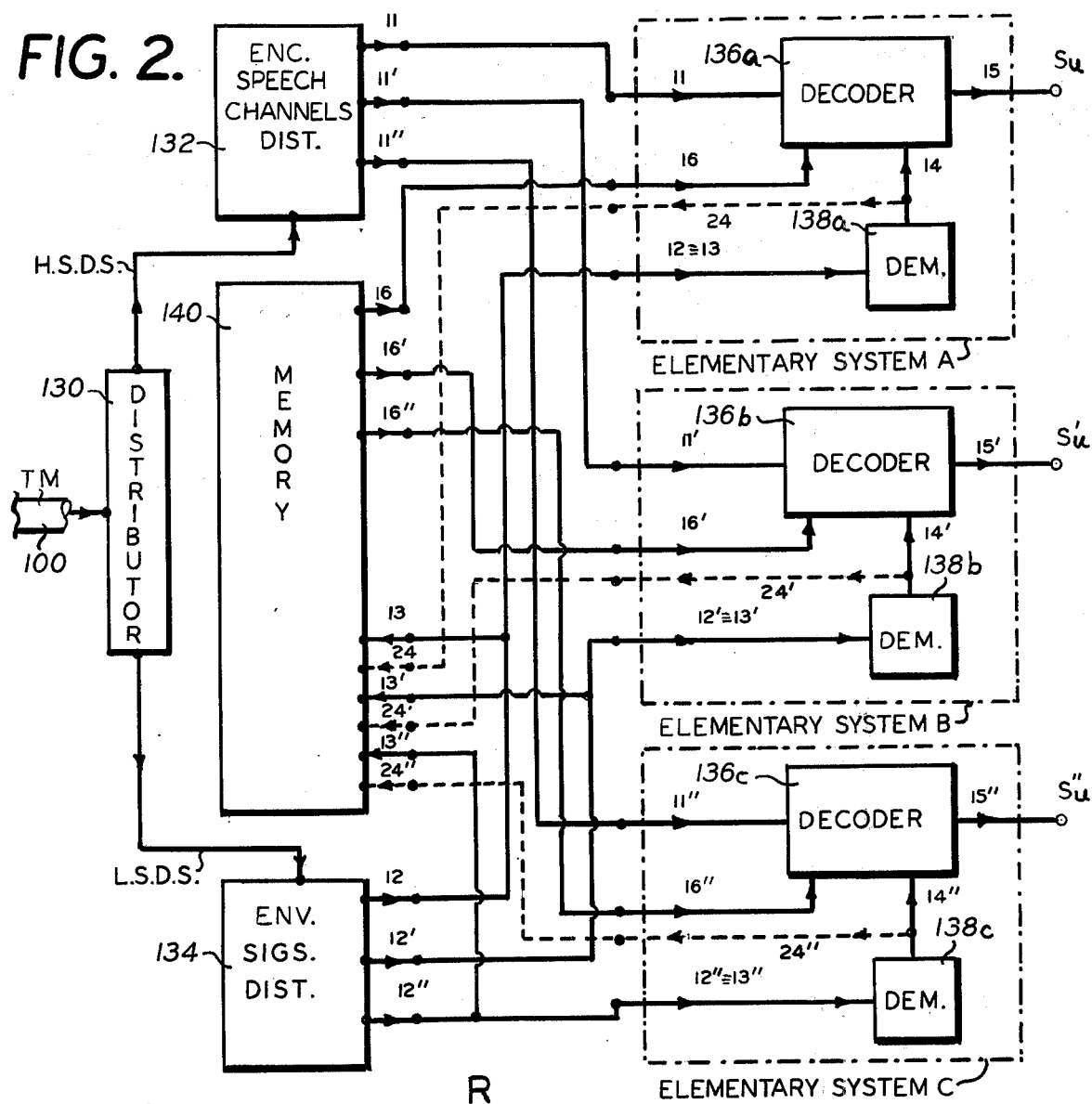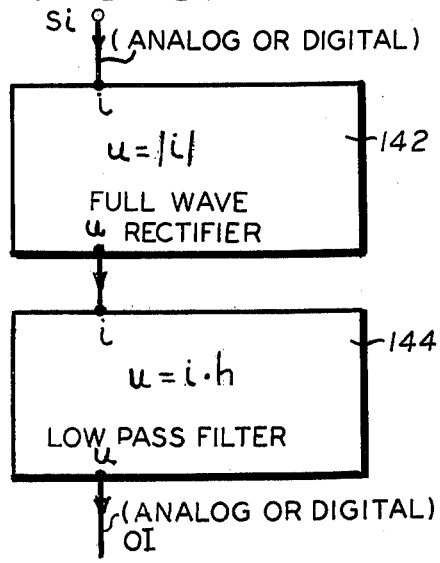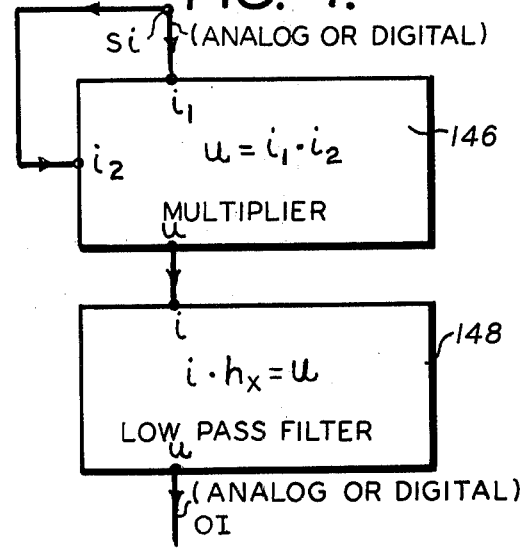

PULSE-CODE MODULATION COMMUNICATION SYSTEM

BACKGROUND OF THE INVENTION

1. Field of the Invention

This invention relates to digital telephone communication systems (employing pulse-code modulation [PCM]) with redundancy reduction; more particularly, the invention concerns a system for reducing the redundancy of pulse-mode modulation encoded speech signals by means of variable companding laws and a variable number of bits per sample.

2. Description of the Prior Art

The majority of pulse-code modulation transmission systems presently being manufactured provide for time-division multiplexing and analogue-to-digital conversion of a given number of speech channels, such as generally 30 such channels. These prior art systems are characterized by an overall transmission rate of about two million bits per second, with each speech channel being sampled every 125 $\mu$sec and a sample being encoded in eight bits. Consequently, a transmission rate of 64,000 bits per second corresponds to each such speech channel.

Prior art pulse-code modulation systems employ logarithmic companding in order to make the signal-to-noise ratio as constant as possible over a wide volume range of the input signal. The primary reason for this is that in such prior art systems, the companding law is fixed, i.e., independent of the structure and form of the input signal, and, therefore, an attempt to cover the volume range needed for all kinds of talkers (e.g., +6db to −50db) in the majority of pulse-code modulation systems, especially in Europe, a logarithmic companding law (such as one approximated by 13 linear segments) associated with 8 bit sample encoding has been utilized. Such prior art logarithmic companding associated with sample encoding results in a constant, precision measurement since the region of small amplitude signals is finely subdivided whereas the region of large amplitude signals is only roughly subdivided. Thus, if the speech signal stays at a high level for a relatively long time, the fine subdivision which occurs due to the fixed companding law in the low level region is useless; while if the speech signal stays at a low level for a relatively long time, the rough subdivision which occurs due to the fixed companding law in the high level region is similarly useless. Thus, the aforementioned prior art conventional systems are not satisfactory in that the use of a fixed companding law results in the necessity of using a high number of bits per sample. These disadvantages of the prior art are overcome by the present invention.

SUMMARY OF THE INVENTION

The speech signal has peculiar characteristics in that it may be considered as an amplitude-modulated wave consisting of a carrier frequency and a modulating signal or envelope. The carrier may have an instantaneous frequency ranging from 300 to 3400 Hz, whereas the envelope frequency is much lower, such as normally 0–100 Hz. By utilizing such an envelope in the system of the present invention, a companding law can be provided which varies as the talker varies and, for a particular talker, as the short-time volume of that talker varies, so that redundancy may be reduced without impairing transmission quality. The preferred companding law of the system of the present invention adapts itself to the vowels, consonants and syllables of the word in accordance with their volumes in order to optimize the signal to quantizing noise ratio.

The preferred system of the present invention, extracts an envelope signal (or envelope wave) related to each speech channel treated by the system as the transmitter portion of the system. This envelope signal is discriminated so as to determine to which volume slot out of $n$ possible volume slots it belongs. The envelope signal is processed, that is modulated, such that it may be sent to both the far-end terminal and a local memory suitable for storing the volume states of all the speech channels handled by the system. The input signal pertinent to a particular talker is encoded by one of $n$ variable companding law, this law being determined by the actual value of the envelope wave associated with the input signal and by the volume states of all the other speech channels.

Other digital signals, which are useful for reconstructing the volume states are preferably transmitted together with the digital signals resulting from the encoding of the input signal associated with a particular talker. The transmission rate of these other signals is negligible as compared to the rate of the encoded speech channels, which is less than that occurring in conventional pulse-code modulation systems, the number of bits per sample issuing from the encoder being a function of the volume states of that particular speech channel (to which the sample refers) as well as of all the other speech channels. With respect to the receiver portion of the preferred system of the present invention, high speed digital signals are separated from low speed digital signals therein. Through use of these low speed digital signals, the "volume slot" to be assigned to the envelope signal associated with a particular talker is selected out of $n$ possible volume slots. The volume state of all the speech channels treated by the system is reconstructed from the incoming envelope signal with the high speed digital signals being decoded by using variable expansion laws which are determined by the actual value of the envelope signal of the channel being processed and by the volumes state of all the speech channels treated by the system, the decoder output signal being congruent with the encoder input signal. The transmitting equipment utilized in the above system substantially consists of an extractor of the envelope signal (or short-time power) of the input signal associated with a particular or single talker; a discriminator of this envelope signal for assigning it to one of $n$ possible volume slots; a digital modulator or transducer for the envelope signal, which suitably treats it in view of its transmission; a local demodulator for the envelope signal; a centralized memory for storing the volume state of all the speech channels handled by the system; an encoder for the input signal associated with a particular or single talker utilizing compression laws and a number of bits per sample that vary in accordance with the value of the specific input envelope and the volume state of all the speech channels treated by the system; a combiner for the high speed encoded speech signals arriving from the encoders of several elementary systems; a combiner for the low speed digital signals arriving from the modulators of several elementary systems, and a final combiner for the high speed and low speed digital signals.

As a consequence, the receiving equipment utilized in the above system comprises a selector or separator for high speed and low speed digital signals; a distributor for high speed digital signals to the decoders of several elementary systems, and a distributor for low speed digital signals to the demodulators of several elementary systems; one demodulator (or several according to the number of elementary systems served by the distributors) which is identical to the local demodulator provided in the transmitter portion; a centralized memory identical to the transmitter portion memory; and one decoder (or several, according to the number of elementary systems served by the distributors) which is complementary to the transmitter portion encoder.

In some particularly advantageous embodiments of the invention the variable companding laws are represented by families of characteristics which may be linear, or logarithmic (approximated by linear segments), or mixed (logarithmic and linear). A feature of the invention is the use, for the envelope signal, of modemodulation by reconstruction of intermediate samples, and of multi-state differential modemodulation, preferably with three states.

Preferably with the system of the present invention, it is possible to reduce the number of bits per sample such as by from 1 to 6 in accordance with the required performance. This is accomplished by suitably selecting, in accordance with the envelope signal associated with a particular talker, one of the available companding laws belonging to the considered family. Moreover, if several speech channels are handled by the system, the variability of the number of bits per sample, operated by the encoder in accordance with the volume state provided by the centralized memory, allows a further reduction of the transmission rate associated with a single speech channel; for this transmission rate, values such as ranging from 56 to 16,000 bits per second being achievable.

The transmission rate needed to send information concerning the envelope of each speech channel to the remote terminal (which must provide complementary expansion to transmitter portion compression) is negligible as compared to 16,000 bits per second, the above mentioned rate being such as 100 to 1000 bit/sec.

BRIEF DESCRIPTION OF THE DRAWING

FIG. 2 is a block diagram of the preferred receiver portion of the preferred communication system of the present invention;

FIG. 3 is a block diagram of a typical extractor for the envelope signal for determining the short-term mean value of the envelope signal;

FIG. 4 is a block diagram of a typical extractor for the envelope signal for determining the short-term mean square value of the envelope signal;

DETAILED DESCRIPTION OF THE PREFERRED EMBODIMENTS

Figure 1:
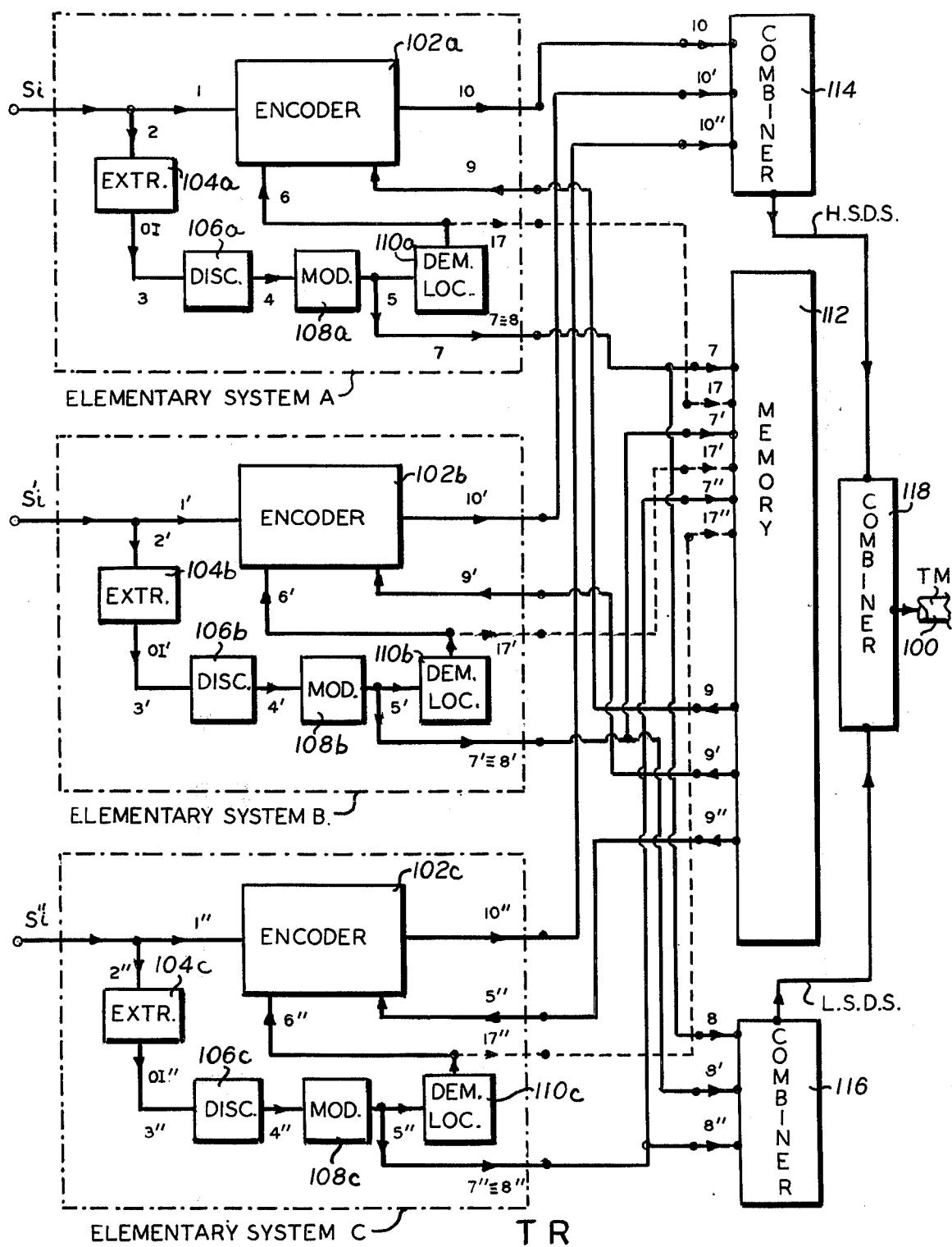
FIG. 1 is a block diagram of the preferred transmitter portion of the preferred communication system of the present invention.

Referring now to the drawings in detail, and initially to FIGS. 1 and 2 thereof, FIGS. 1 and 2 are a block diagram of the preferred communication system of the present invention, with FIG. 1 representing the transmitting portion TR and FIG. 2 representing the receiver portion R being interconnected by the transmission medium TM, illustratively shown as a cable 100 although it could be a radio link or equivalent. Referring initially to FIG. 1, $S_i$ represents the useful signal to be transmitted, related to an elementary system and associated with one or several talkers. Thus signal $S_i$ may be an analogue signal in the speech band (related to a single or particular talker), or a pulse-amplitude-modulated (PAM) analogue signal (related to one talker) or a PAM analogue signal resulting from time-division multiplexing of several speech channels, or a digital signal resulting from individual pulse-code modulation (PCM) encoding of one speech channel, or a digital signal resulting from time-division multiplexing and PCM encoding of several speech channels. If $S_i$ is a signal resulting from time-division multiplexing, then in the description of an elementary system which follows, all of the functional blocks that constitute such an elementary system must be considered as working on a time-division basis.

As shown and preferred in FIG. 1, a typical elementary system A being described, $S_i$ is applied through line 1 to an encoder 102a, characterized by $m$ variable compression laws and by a variable number of bits per sample at its output, and through line 2 to an envelope-signal extractor 104a (EXTR.). The extracted envelope signal OI is applied through line 3 to a discriminator (DISC.) 106a which assigns the envelope signal to one of $n$ possible volume slots (or belonging states). The discriminated envelope signal supplied by 106a is applied through line 4 to a digital modulator (MOD.) 108a (or transducer). This modulator 108a processes the received information in such a manner as to make it suitable for transmission to the remote terminal and to the local memory. The output signal from modulator 108a is applied through line 5 to a local demodulator 110a (DEM.LOC.) that processes the signal again so as to make it applicable via line 6, and understandable to the encoder 102a. The output signal from 108a is also applied through line 7 to a centralized memory 112 which can store the volume state of all the speech channels treated by the system. Through line 9, memory 112 supplies to encoder 102a suitable information for selecting the number of bits per sample, this information being a function of the volume state of all the speech channels treated by the system. The compression law used by encoder 102a and the number of bits per sample at its output are determined by the information provided by local demodular 100a via line 6 and memory 112 via line 9. As shown and preferred in FIG. 1, the system may comprise a plurality of elementary systems, such as the three shown by way of example, designated A, B and C, all of which are preferably identical in function and operation and accordingly utilize the same reference numeral for the components as for System A followed by the letters *b* and *c*, respectively, for systems B and C, and with the same reference numerals for the lines as for system A followed by a single prime (') and a double prime (''), respectively, for systems B and C.

Preferably, in the transmitter shown by way of example in FIG. 1, the encoded signals provided by encoders 102a, 102b and 102c through lines 10, 10', 10'', respectively, are applied to a combiner 114 of encoded speech samples which provides a stream of high speed digital signals (H.S.D.S). The digital signals provided by modulators 108a, 108b, 108c are applied through 7, 7', 7'', respectively, to the centralized memory 112, and then through 8, 8', 8'', respectively, to a combiner 116 for the modulated envelope signals which provides low speed digital signals (L.S.D.S.). These signals represent the transmitted information concerning the value of the envelope signals. Thus, combiner 114 provides an output stream H.S.D.S. of high speed digital signals and combiner 116 provides an output stream L.S.D.S. of low speed digital signals. These two streams H.S.D.S. and L.S.D.S. are put together in a final combiner 118 for the digital information which will send a single stream of mixed digital signals (fast and slow) to the transmission medium 100. Since the PCM encoding is that used for speech channels, the time interval between a sample of a channel and the successive sample of the same channel is preferably on the order of 125 $\mu$sec at a 8 KHz sampling frequency.

Consequently, final combiner 118 will preferably send a strong of bits on the transmission line every 125 $\mu$sec; the number of bits in the string (referred to herein as "frame" depending on the capacity of the transmission medium 100. Preferably, a predetermined number of bits in the frame, such as 1/32, are reserved for an alignment function; other bits, such as 2/32, are reserved for signalling; and a relatively small, such as 1/32, portion of the frame is preferably reserved for low speed digital signals L.S.D.S., while the remainder of the frame, the largest portion, is preferably reserved for high speed signals H.S.D.S. Preferably, the resultant system of the present invention exhibits a lower sensitivity to errors on the transmission line than is exhibited by conventional PCM systems. Furthermore, in accordance with the present invention, preferably the speech signal present therein is associated with two information flows, one a suitable protected low speed flow having a heavy information content (e.g., envelope signals and L.S.D.S.) and the other a high speed flow similar to that transmitted by conventional PCM systems. The latter is unprotected but is characterized by the fact that an error on the line produces less disturbance on the transmitted information than would be produced by the same error in a conventional PCM system.

In the preferred system of the present invention, the variability of the number of bits per sample — operated by the encoder 102a, for example, and controlled by centralized memory 112 — occurs in any case in such a manner as to cover the frame portion made available to combiner 114 by combiner 118 and to the various encoders 102a, 102b, 102c, etc. by combiner 114 with the maximum number of significant bits. Consequently, any additional noise introduced by the encoders 102a, 102b, 102c, etc. is reduced to a minimum.

As previously mentioned, the centralized memory 112 is fed by the various modulators 108a, 108b, 108c, etc., through lines 7, 7', 7'', etc. As an alternative, however, memory 112 can be fed directly by the outputs of the various local demodulators 110a, 110b, 110c, etc., through 17, 17', 17'', etc., such an alternative arrangement being shown in FIG. 1 by dotted lines.

Referring now to FIG. 2, the receiver portion R of the system shall be described. At the receiving terminal R there is a first selector (or distributor) of digital signals 130 which sends high speed signals H.S.D.S. to the encoded speech channels distributor 132 and low speed signals L.S.D.S. to the envelope signals distributor 134. Distributor 132 through lines 11, 11', 11'', etc., feeds decoders 136a, 136b, 136c, etc. (one decoder being provided for each elementary system A, B, and C, respectively, with elements in system B and C which are identical in function and operation to system A having the same reference numeral as for system A followed by the letters *b* and *c*, respectively, for systems B and C, and with the same reference numerals for the lines as for system A followed by a single prime (') and a double prime (''), respectively, for systems B and C which are characterized by *m* variable expansion laws and by a variable number of bits per sample at their input. The envelope signals distributor 134, through lines 12, 12', 12'', etc., feeds the demodulators (DEM) 138a, 138b, 138c, respectively, of the low speed digital signals (L.S.D.S.) representing the envelope signals. The output information from distributor 134 is applied to a centralized memory 140, through lines 13, 13', 13'', etc., which is thus set to the same state as the transmitter portion memory 112 through 14, 14', 14'', etc. The same information is then applied via lines 14, 14', 14'', etc., from demodulations 138a, 138b, 138c, respectively, to decoders 136a, 136b, 136c, respectively, which operate in an exactly complementary manner with respect to the transmitter portion encoders 102a, 102b, and 102c.

The useful output signals labeled $S_u$, $S_u'$, $S_u''$ for systems A, B and C, respectively (one useful output signal being provided for each elementary signal), are provided at the output of decoders 136a, 136b, 136c, respectively, on lines 15, 15', 15'', etc., respectively, each such output signal $S_u$, $S_u'$, and $S_u''$, corresponding to the relevant transmitter portion input signal $S_i$, $S_i'$, and $S_i''$. It should be noted that the receiver portion local demodulators 138a, 138b, 138c are preferably identical to the transmitter portion demodulators 110a, 110b, 110c, and that memory 140 is set exactly to the same state as the receiver portion memory 112. Therefore the same signals are present on lines 16 and 9 and on lines 14 and 6 so that the respective encoders 102a, 102b, 102c and decoders 136a, 136b, 136c work in perfect synchronism and process their input signals in an exactly complementary manner.

As previously mentioned with regard to the transmitter portion memory 112, the receiver portion memory 140 can also be fed by demodulators 138a, 138b, 138c via lines 24, 24', 24'', respectively, shown in dotted lines in FIG. 2. Thus, if the transmitter portion memory 112 is fed by the demodulators 110a, 110b, 110c, the receiver portion memory 140 will be fed by demodulators 138a, 138b, 138c; whereas, if the transmitter portion memory 112 is fed by modulators 108a, 108b, 108c, the receiver portion memory 140 will be fed directly by envelope signals distributor 134.

TRANSMITTER

Now describing the envelope signal extractor with reference to a typical extractor 104a, 104b or 104c of transmitter portion TR(FIG. 1) in greater detail with reference to FIGS. 3 and 4, all of the extractors 104a, 104b, and 104c preferably being identical in structure and operation. The extractor 104a of the envelope signal OI can operate in different ways: for only one speech channel, or for several speech channels on a time-division basis; with an analogue or digital signal at its input; with an analogue or digital signal at its output.

In any case it includes two fundamental functions: conventional full wave rectifier 142 followed by an appropriate conventional low pass filter 144 as shown in FIG. 3; or a conventional multiplier 146 followed by an appropriate low pass filter 148 as shown in FIG. 4. This corresponds to determining respectively the short time mean value (FIG. 3) and the short time mean square value (FIG. 4) both values supplying information strictly related to the envelope signal.

As previously mentioned the input signal $S_i$ can be associated with one or several talkers, and it can be analogue or digital; similarly, the output signal OI from low pass filter 148 can be associated with one or several talkers, and it can be analogue or digital. It should be noted that, preferably, if $S_i$ has already been subjected to PCM encoding with a logarithmic compression law (such as approximated by 13 linear segments), the functions shown in FIGS. 3 or 4 can be directly applied to a sequence of samples expressed in compressed binary digit; or these functions can be applied to a sequence of samples expressed in linear binary digits, these latter being obtained from the compressed digits through an expansion which is complementary to the logarithmic compression performed by PCM enclonding at a previous point.

Now describing a typical discriminator 106a, 106b or 106c of transmitter portion TR, all of the discriminators 106a, 106b, 106c preferably being identical in structure and operation, the discriminator 106a must be compatible with the envelope signal extractor 104a. If the discriminator input signal OI is analogue, the discriminator 106a provides for a suitable analogue-to-digital conversion; if instead the input signal OI is digital the discriminator 106a provides for a digital-to-digital conversion. The output from the discriminator 106a, is, in any case, digital and characterized by a number K of bits such that $2^K \geq n$.

Through line 4 discriminator 106a sends information to digital modulator 108a, preferably with a sampling period by way of example, of 125 μsec.

The main function of discriminator 106a is to define to which of n available volume slots the incoming envelope signal belongs, and to update this definition for each talker preferably every 125 μsec., which is the typical preferred sampling period for PCM encoded speech signals.

Now describing a typical modulator 108a, 108b, or 108c, demodulator 110a, 110b or 110c, and demodulator 138a, 136b or 138c. With an updating period of preferably 125 μsec, digital modulator 108a, 108b or 108c receives at its input the numerical value corresponding to the volume slot assigned to envelope signal OI, this value being provided by discriminator 106a, 106b or 106c, respectively, through line 4, 4' or 4". Modulator 108a, 108b or 108c operates on this digital signal in order to send to combiner 116 only the information required for reconstructing the same signal at the remote terminal. The information processed by modulator 108a, 108b 108c, and therefore present at its output, is much slower than the signal operated on by this encoder-decoder 102a–136a, 102b–136b or 102c–136c. This information follows three different paths: the first (line 5), to the local demodulators 110a, 110b 110c; the second (line 8) to combiner 116 for transmission to the remote terminal; the third (line 7) to the centralized memory 112 for construction of the volumes state of all the speech channels treated by the system.

Local demodulator 110a, 110b or 110c (or respectively demodulator 138a, 138b or 138c) after receiving the information strictly needed to reconstruct the complete signal, sends the value of the reconstructed signal to encoder 102a, 102b or 102c through line 6, 6' or 6" (or to decoder 136a, 136b or 136c, through line 14, 14' or 14").

The signal supplied by demodulator 110a, 110b or 110c to encoder 102a, 102b or 102c, respectively, and by demodulator 138a, 138b or 138c to decoder 136a, 136b or 136c, respectively, must be updated every 125 μsec, which is the time period between the talker's speech samples that must be worked out by encoder 102a, 102b or 102c, and by decoder 136a, 136b or 136c.

With respect to combiner 114, combiner 116, combiner 118, encoded speech channels distributor 132, envelope signals distributor 134, and distributor 130, since these functions are the same as are used in conventional digital transmission systems, they have limited importance as far as the invention is concerned. In general they will be synchronous or asynchronous digital multiplexers (114,116,118) and synchronous or asynchronous demultiplexers (132,134,130).

Now referring to the centralized memory, the transmitter portion centralized memory 112 is preferably identical to the receiver portion centralized memory 140. The sequence of states that are assumed by the transmitter portion memory 112 is preferably identical to the sequence of states that are assumed by the receiver portion 140. This occurs because the two memories are identical and receive exactly the same signals at their inputs.

Their state is preferably updated with the typical period of the signals provided by the modulators 108a, 108b, 108c, etc. of the various elementary systems A, B, and C. The basic function of the memories 112 and 140 is to store the volumes state (or system state) of all the speech channels, and to feed encoders 102a, 102b, 102c and decoders 136a, 136b, 136c, respectively (lines 9, 9", 9" and 16, 16', 16", respectively) with suitable information for selecting the number of bits per sample. The selection information supplied to the encoders 102a, 102b 102c by memory 112, and the decoders 136a, 136b, 136c by memory 140, preferably have an updating period of 125 μsec, which is the time interval between the talker's speech samples that must be processed by encoders 102a, 102b, 102c and decoders 136a, 136b and 136c. As an alternative, the transmitter portion centralized memory 112 can be fed by local demodulators 110a, 110b, 110c and the receive portion centralized memory 140 can be fed by demodulators 138a, 138b, 138c, rather than by modulators 108a, 108b, 108c for the transmitter and distributor 134 for the receiver as shown in FIGs. 1 and 2, respectively, by dotted lines 17 and 24, respectively. With this type of connection, the information flow entering the memories 112 and 140 and exiting therefrom is also characterized, preferably by a period of 125 μsec. The centralized memory 112 or 140 knows the availability of bits in the frame, as well as the volumes state of all the speech channels. Its specific function is to distribute the available bits in the frame among the various speech channels, so as to optimize their signal/quantizing noise ratios. Since encoding is a specific function of the encoders 102a, 102b, 102c, they preferably receive from the memory 112 (through lines 9,9′,9″) the exact criterion concerning the speech channel whose sample is being processed at that instant.

The encoder and decoder functions can be analyzed simultaneously, since the description of their operation applies to both. A typical encoder 102a (or typical decoder 136a) preferably has four ports; an input port 6(14) for the digital envelope signal sent by 110a, (138a for 136a); an input port 1 (output port 15 for 136a) for the signal $S_t$ ($S_u$ for 136a) associated to one or several talkers; an input port 9 (16 for 136a) for the information provided by the memory 112 (140 for 136a); an output port 10 (input port 11 for 136a) toward combiner 114 (distributor 132 for 136a). The output 10 toward the combiner 114 is the preferred PCM signal having reduced redundancy in accordance with the preferred embodiment of the present invention. If the signal $S_t$($S_u$ for 136a) associated with one or several talkers is analogue then the encoder 102a (or decoder 136a) is an analogue-to-digital (digital-to-analogue for 136a) convert, characterized by a compression (expansion for 136a) low and a number of bits per sample which can be controlled by a digital signal one portion of which arrives from demodulator 110a via line 6 (demodulator 138a via line 14 for 136a) memory 112 via line 9 (memory 140 via line 16 for 136a). If the signal $S_t$($S_u$ for 136a) associated with one or several talkers is already digital (e.g., 8 bit PCM encoding with 13 segments logarithmic companding law), then the encoder 102a (or decoder 136a) is a digital-to-digital converter, characterized by a transfer function and a bit number decrease (increase for 136a) that can be controlled by a digital signal. The encoder 102a provides for a variable decrease (increase for 136a) of the number of bits per sample with respect to current PCM encoding with 8 bits per sample. In case of digital-to-digital conversion, the transfer characteristic (or transcoding) must be congruent with the decreased (increased for 136a) number of bits and with the resolution of the previous PCM encoding (e.g., 8 bit, 13 segment logarithmic law). The encoder 102a receives, at its input 1, a speech sample associated with one talker; at its input 6 the information concerning the envelope signal associated with this talker, a sample of which is being processed; and at its input 9, a criterion dependent on the volume state of all the speech channels treated by the complete system. The encoder 102a specific function is to process the sample with one of $m$ possible compression laws and a number of bits per sample such as to maximize the signal/quantizing noise ratio.

Among the advantages of the preferred system of the present invention having reduced redundancy, the two that are particularly substantial are ease of implementation and reduced transmission rate with the same quality performance as is offered at 32,000 bits/sec. by current PCM transmission systems (characterized by 64,000 bits/sec.). Moreover, if it is determined that a transmission quality worse than is offered by current PCM systems is acceptable, then the transmission rate per speech channel can be further reduced without impairing intelligibility.

PARTICULAR EMBODIMENTS

In the following are described some compression for 102a (respectively expansion for 136a) laws which optimize the signal/noise ratio, and some methods of envelope-signal modulation (demodulation for 136a) which allow the preferred system according to the invention to be realized by circuit solutions that are purely digital, hence extremely simple. These extremely simple embodiments are based on the use of compression for 102a (expansion for 136a) laws derived from a family of linear compression characteristics; a family of logarithmic compression characteristics approximated by linear segments; and also on the use of modemodulation of the envelope signal by reconstruction of intermediate samples; tri-state differential modemodulation of the envelope signal.

EXAMPLE 1

FAMILY OF LINEAR COMPRESSION CHARACTERISTICS

Figure 5:
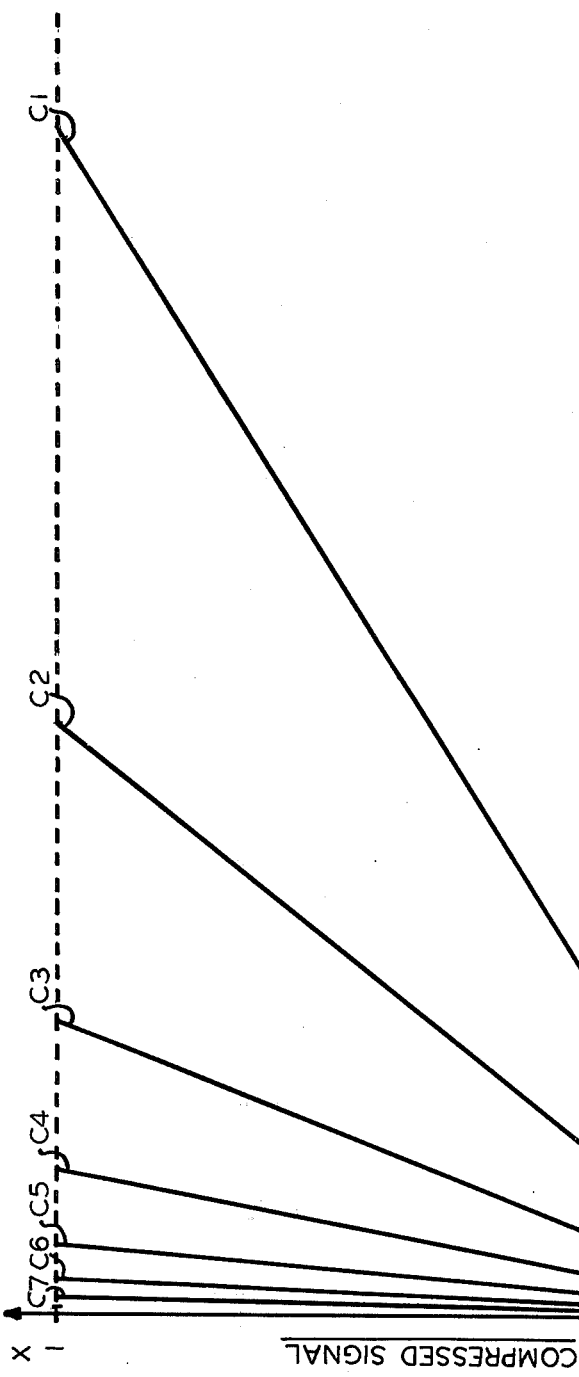
FIG. 5 is a graphic illustration of a family of linear compression characteristics utilized with the present invention in an example thereof.

The system was operated under the following conditions: The signal $S_t$ associated with one or several talkers (FIG. 1) resulted from the time division multiplexing of 30 speech channels and from the subsequent 8 bit PCM encoding with 13 segment logarithmic compression law (see CCITT — Primary PCM Multiplex Equipments). There were two elementary systems A, B (FIG. 1) and the volume range of the envelope signal OI was divided into 8 possible slots ($n=8$) by the envelope signal discriminator 106a, 106b. The envelope signal OI was extracted, as shown in FIGS. 3 and 4, by using four digital low-pass filters working on a time division basis. The low-pass filters 144 and 148 were obtained by using a single time constant in the 4–40 msec range. The encoder 102a, 102b with variable compression laws was such as to provide for the decrease of 2-3-4-5-8 bits per sample, depending on the volumes state of all the speech channels identified by centralized memory 112. Consequently, decoder 136a, 136b with variable expansion laws was such as to provide for the increase of 2-3-4-5-8 bits per sample, the output signal $S_u$(FIG. 2) associated with one or several talkers, being suitable for reprocessing by an 8-bit PCM system with 13 segment compression law, CCITT. The total transmission rate made available to the two elementary systems A,B by combiner 114 and combiner 116 (FIG. 1) was determined by a string of 256 bits every 125 μsec, which included the signaling function (8–16 bits) and the alignment function (1–8 bits). The encoder 102a,102b was a purely combinational digital circuit characterized by: 8 bits at the input (8-bit PCM encoding with 13 segment logarithmic companding law, see FIG. 1, line 1); 3 bits at the input (allocation of the envelope signal to one of the 8 volume slots provided, envelope signal related to the speech channel associated with the sample being treated in that time interval, see FIG. 1, line 6); 3 bits at the input (decrease of 2-3-4-5-8 bits per sample dependent on the volume state of all the speech channels, identified by memory 112, see FIG. 1, line 9); 6-5-4-3-0 bits at the output (PCM encoding with reduced redundancy, see FIG. 1, line 10);

Consequently, decoder 136a,136b was a purely combinational digital circuit characterized by: 6-5-4-3-0 significant bits at the input (PCM encoding with reduced redundancy, see FIG. 2, line 11); 3 bits at the input (allocation of the envelope signal to one of the 8 volume slots provided, envelope signal related to the speech channel associated with the sample being treated in that time interval, see FIG. 2, line 14); 3 bits at the input (increase of 2-3-4-5-8 bits per sample, dependent on the volume state of all the speech channels identified by memory 140, see FIG. 2, line 16); 8 bits at the output (8 bit PCM encoding with 13 segment logarithmic companding law, see FIG. 2 $S_u$);

The compression law for encoders 102a,102b or expansion law for decoders 136a,136b utilized by the complete system 8 bit PCM encoding with 13 segment logarithmic characteristic plus transcoding operated by the encoder under consideration consisted of a family of linear characteristics (see FIG. 5) complying with the following table:

| ENVELOPE SIGNAL VOLUME SLOT | NUMBER OF DECREASED BITS | COMPRESSION CHARACTERISTIC |
|---|---|---|
| (from 110a,110b) | (from 112) | (operated by 102a, 102b) |
| 1 (largest) | 2-3-4-5 ⟶ | C1 |
| 2 | 2-3-4-5 ⟶ | C2 |
| 3 | 2-3-4-5 ⟶ | C3 |
| 4 | 2-3-4-5 ⟶ | C4 |
| 5 | 2-3-4-5 ⟶ | C5 |
| 6 | 2-3-4-5 ⟶ | C6 |
| 7 | 2-3-4-5 ⟶ | C7 |
| 8 (smallest) | ⟶ 8 | — |

In this particular case it should be noted that, while the compression characteristic is determined by the envelope signal associated with the talker whose sample has to be processed, the number of decreased bits is determined by the volumes state of all the speech channels handled by the system. An exception to this rule is slot 8 which is associated with the concept of idle channel (pauses between words, listening intervals, channel disconnect). In this exception, no information about the samples of that channel is transmitted to the remote terminal. The criterion on which the variability of the number of bits per channel is based consists of covering, with the maximum number of significant bits, the transmission rate made available to encoders 102a and 102b by combiner 114; and, hence, to minimize the additional noise introduced by these encoders 102a,102b during signal treatment.

EXAMPLE 2

FAMILY OF LOGARITHMIC COMPRESSION CHARACTERISTICS APPROXIMATED BY STRAIGHT LINE SEGMENTS

The system was operated under the following conditions:

The signal $S_i$ associated with one or several talkers (FIG. 1) resulted from the time division multiplexing of 30 speech channels and subsequent 8 bit PCM encoding with 13 segment logarithmic compression law (see CCITT - Primary PCM Multiplex Equipments). Once again, there were two elementary systems A,B (FIG. 1) and the volume range of the envelope signal OI was divided, by envelope signal discriminator 106a,106b into 8 ($n=8$) possible slots. The envelope signal was extracted as shown in FIGS. 3 and 4, by four digital low pass filters working on a time division basis. The low-pass filters 144 and 148 were obtained by using a single time constant in the 4–40 msec. range. The encoder 102a, 102b with variable compression laws was such as to provide for the decrease of 0-1-2-3-4-5-8 bits per sample depending on the volumes state of all the speech channels, identified by centralized memory 112.

Consequently, decoder 136a,136b with variable expansion laws was such as to provide for the increase of 0-1-2-3-4-5-8 bits per sample, the output signal $S_u$ (FIG. 2) associated with one or more talkers being suitable for reprocessing by an 8 bit PCM system with 13 segment logarithmic companding law, CCITT. The total transmission rate, made available to the two elementary systems A,B by combiner 114 and combiner 116 (FIG. 1) was determined by a string of 256 bits every 125 $\mu$sec, which included the signalling function (8–16 bits) and the alignment function (1–8 bits). Encoder 102a,102b was a purely combinational digital circuit characterized by: 8 bits at the input (8 bit PCM encoding with 13 segment logarithmic companding law $S_1$ in FIG. 1, line 1); 3 bits at the input (allocation of the envelope signal to one of the 8 possible volume slots, envelope signal related to the speech channel associated to the sample being treated in that time interval, see FIG. 1, line 6); 3 bits at the input (decrease of 0-1-2-3-4-5-8 bits per sample depending on the volume state of all the speech channels, identified by memory 112, see FIG. 1, line 9); and 8-7-6-5-4-3-0 significant bits at the output (PCM encoding with reduced redundancy, see FIG. 1, line 10).

Consequently, decoder 136a,136b was a purely combinational digital circuit characterized by: 8-7-6-5-4-3-0 significant bits at the input (PCM encoding with reduced redundancy, see FIG. 2, line 11); 3 bits at the input (allocation of the envelope signal to one of the 8 volume slots provided, envelope signal related to the speech chancel associated with the sample being treated in that time interval, see FIG. 2, line 14); 3 bits at the input (increase of 0-1-2-3-4-5-8 bits per channel depending on the volume state of all the speech channels, identified by memory 140, see FIG. 2, line 16); and 8 bits at the output (8 bit PCM encloding with 13 segment logarithmic companding law, see FIG. 2, line 15-$S_u$).

Figure 6:
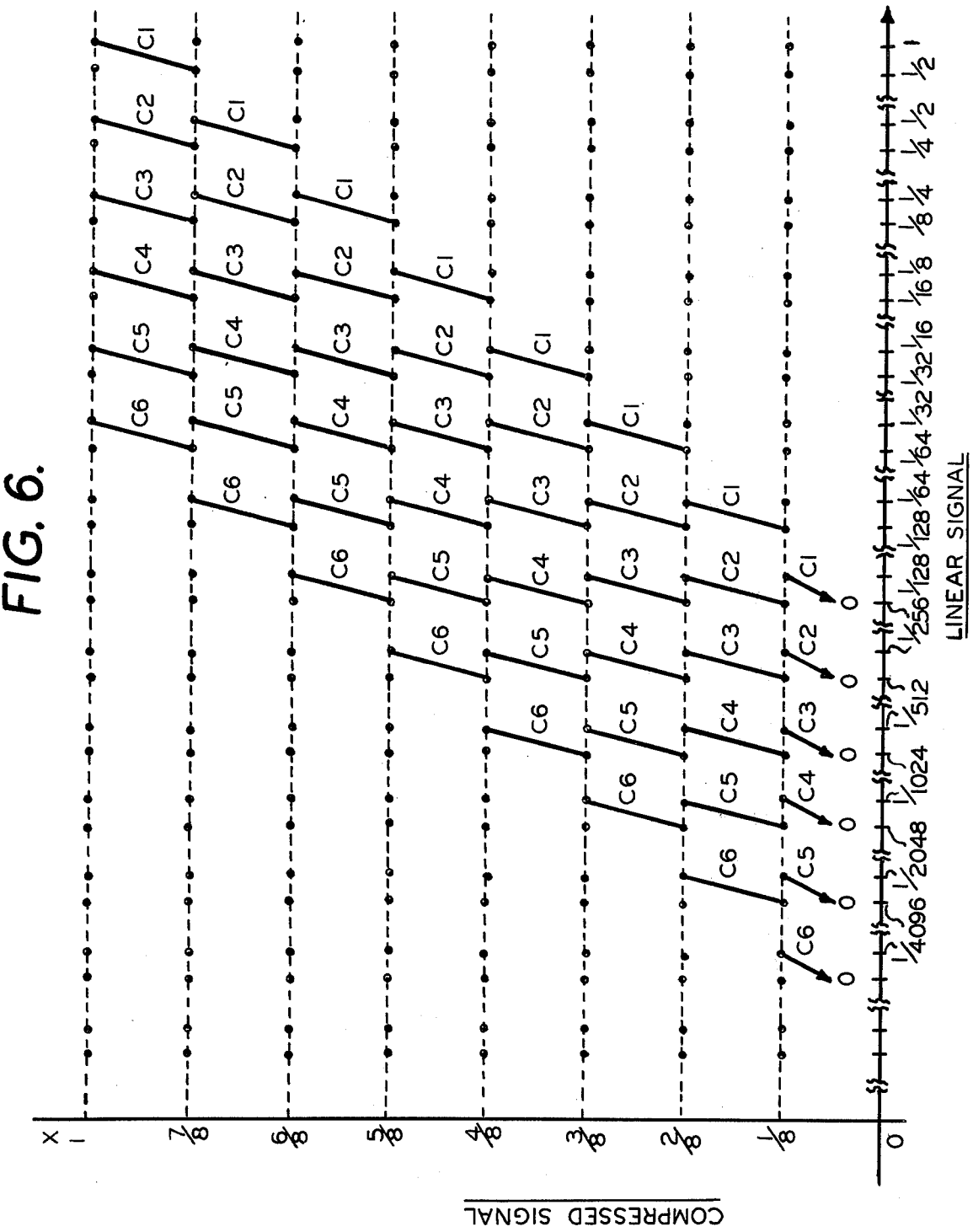
FIG. 6 is a graphic illustration of a family of logarithmic compression characteristics approximated by straight line segments utilized with the present invention in an example thereof.

The compression law for encoders 102a,102b or expansion law for decoders 136a,136b by the complete system (compressed 8 bit PCM encoding with 13 segment law, plus transcoding operated by the encoder under consideration) consisted of a family of logarithmic curves approximated by straight line segments, as shown in FIG. 6 (where the linear signal is on the X axis and the compressed signal on the Y axis).

These curves comply with the following table:

| ENVELOPE SIGNAL VOLUME SLOT | NUMBER OF DECREASED BITS | COMPRESSION CHARACTERISTICS |
|---|---|---|
| (Selected by 110a,110b) | (controlled by 112) | (Operated by 102a,102b) |
| 1-2-3-4-5-6-7 | 0 → | C1 |
| 1 | 1 → | C1 |
| 2-3-4-5-6-7 | 1 → | C2 |
| 1 | 2 → | C1 |
| 2 | 2 → | C2 |
| 3-4-5-6-7 | 2 → | C3 |
| 1 | 3 → | C1 |
| 2 | 3 → | C2 |
| 3 | 3 → | C3 |
| 4-5-6-7 | 3 → | C4 |
| 1 | 4 → | C1 |
| 2 | 4 → | C2 |
| 3 | 4 → | C3 |
| 4 | 4 → | C4 |
| 5-6-7 | 4 → | C5 |
| 1 | 5 → | C1 |
| 2 | 5 → | C2 |
| 3 | 5 → | C3 |
| 4 | 5 → | C4 |
| 5 | 5 → | C5 |
| 6-7 | 5 → | C6 |
| 8 | → 8 | — |

It should be noted that the compression characteristic adopted by the encoder 102a,102b is a function both of the envelope signal and of the number of bits to be decreased by the encoder, the latter information being provided by centralized memory 112. An exception to this rule is slot 8 which is associated with the concept of "idle channel", and hence no information about the samples of this channel is transmitted to the remote terminal. The criterion on which the variability of the number of bits per sample is based consists of covering, with the maximum number of significant bits, the transmission rate made available to encoders 102a and 102b by combiner 114, and, hence, to minimize the additional noise introduced by these encoders 102a,102b during signal treatment.

MUTING LEVEL MOBILITY

In the examples just described above the concept of "idle channel" or absence of useful channel, has been associated with one of the volume slots (e.g., 8) of the envelope signal extracted by extractor 104a,104b and discriminated by 106a,106b, respectively. This "idle channel" concept is related to the fact that a generic talker sends useful signal (speech) during a limited time interval. Considering the pauses, between words and the priods when the talker is listening, the channel associated with the talker is engaged by useful signal only during a percentage of time ranging 40 to 60%. Discriminator 106a,106b is provided with a decision level, associated with the volume slot corresponding to absence of useful signal. Above this level, the discriminator 106a,106b decides for presence of useful signal active channel; below this level, it decides for absence of useful level (idle channel), this level being referred to as the "muting threshold". The muting threshold can be fixed, i.e., pre-determined, and independent of the form and characteristics of $S_t$ and of possible noise superimposed on this signal (such as noise due to the equipment preceding $S_t$). If the muting threshold is fixed, in the presence of noise superimposed on $S_t$ it is not possible to discriminate with certainty the useful (spoken) signal from noise. In the presently preferred embodiments, the mobility of the "muting threshold" has been taken into consideration in order to be able to better discriminate noise from the useful signal. As a consequence, the muting threshold is not fixed but variable, and its value is controlled by a suitable automatic control circuit 198 shown in FIG. 9.

Figure 9:
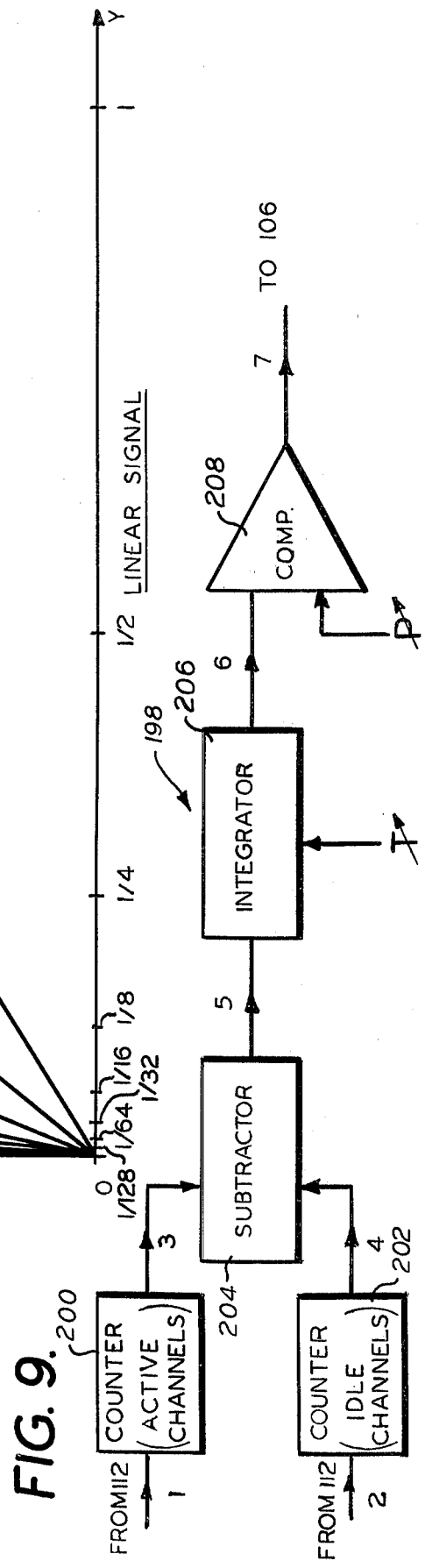
FIG. 9 is a block diagram of the preferred embodiment of an automatic control circuit for controlling the value of the muting threshold.

The automatic control circuit 198, shown in FIG. 9, consists of: a conventional counter 200 of the active channels (where useful signal is present); a conventional counter 202 of the idle channels (where useful signal is not present); a conventional subtractor 204 which provides the difference between the outputs of the two counters 200 and 202; a conventional integrator 206 which averages the output from 204 over a suitable adjustable time interval T; and a conventional comparator 208 which compares the output from 206 with an adjustable magnitude P strictly related to the time percentage in which it is desirable that useful signal be present in the channels. The output from comparator 208 controls the upward or downward variation of the muting threshold in the various discriminators 106. The operating principle of the automatic control circuit 198 is as follows. The counter 200 of the active channels retrieves information (line 1) directly from centralized memory 112, and it moves forward by one step wherewherever a speech channel changes from the "idle" state to the "active" state, vice versa, it moves backward by one step whenever a speech channel changes from the "active" state to the "idle" state. The counter 202 of the idle channels retrieves information (line 2) directly from memory 112, and it moves forward whenever 200 moves backward and vice versa. Subtractor 204, fed by 200-202 (lines 3-4) obtains the difference between the output of the two counters 200 and 202 and sends this difference (line 5) to integrator 206 which averages it over a sufficiently long and adjustable time interval T. The output from 206 (line 6) is applied to comparator 208 where it is compared with an adjustable magnitude P. Comparator 208 is characterized by having an "insensitivity" band $(P+\Delta P)$ to $(P-\Delta P)$. If the upper limit $(P+\Delta P)$ of this band is exceeded, the comparator 208 (line 7) orders discriminators 106 to raise the muting threshold, whereas if the lower limit $(P-\Delta P)$ is exceeded it orders the discriminators 106 to lower the muting threshold.

No matter how the automatic control circuit 198 is realized, the muting threshold will have a maximum value and a minimum value. The results achieved with variable muting threshold are better than those obtainable with fixed muting threshold, especially in the presence of non-negligible noise superimposed on $S_t$.

ENVELOPE SIGNAL MODEMODULATION

In the following, two particularly advantageous forms of realization are described for the modulation for the transmitter TR (or demodulation for receiver R) of the envelope signal OI discriminated by 106, the first being based on reconstruction of intermediate samples; the second being the differential type with 3 states.

MODEMODULATION BY RECONSTRUCTION OF INTERMEDIATE SAMPLES

Figure 7:
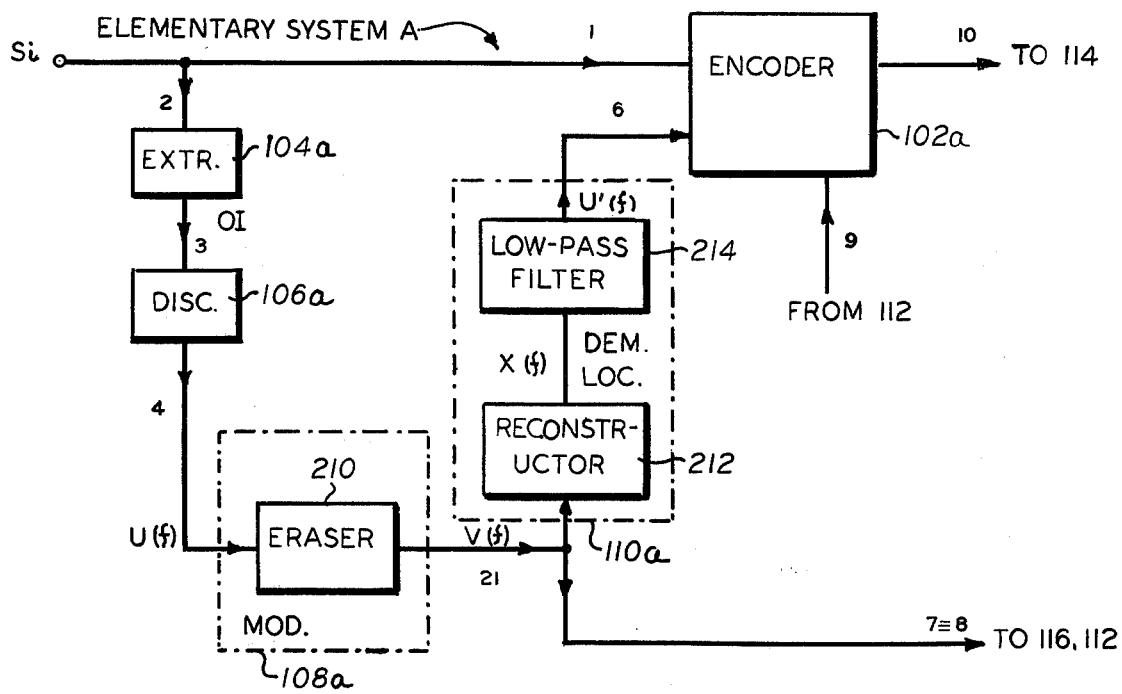
FIG. 7 is a more detailed block diagram of a typical elementary system A of FIG. 1 for one type of modemodulation.

The block diagram of the typical modulator 108a and local demodulator 110a of a typical elementary system, system A, is shown in FIG. 7. Since the receiver portion demodulator 138 is identical to the local demodulator 110, the former will not be described. Modulator 108a preferably consists of an eraser 210, while local demodulator 110a comprises a reconstructor 212 and a suitable low-pass filter 214. Since the entire modemodulation circuit is digital, signals $X(t)$, $V(t)$, $U(t)$ $U'(t)$ are numerical values associated to the digital processing of the envelope signal provided by discriminator 106a. Signal $U(t)$, at the output from discriminator 106a (line 4 in FIG. 7) preferably has a sampling period of 125 usec, as previously mentioned in the description of 106. Since the discriminated envelope signal U(t) is much more band limited than a talker's speech signal, the samples of $U(t)$ taken every 125 usec are definitely redundant for reconstructing $U(t)$. Eraser 210 provides for the elimination of the samples not strictly necessary. Signal $V(t)$ [line 21 in FIG. 7] at the output from 210 is again signal $U(t)$ but with a sampling period much longer than 125 usec. $V(t)$ contains the information strictly necessary to unequivocally determine signal $U(t)$; hence, it is transmitted through 116 to the remote terminal, and simultaneously stored in the local memory 112. Signal $V(t)$ is then treated in an identical manner both at the transmitting terminal TR by 110a and at the receiving terminal R by 138a. As previously mentioned, demodulator 110a is composed of reconstructor 212 and low-pass filter 214. An identical operation, at both the transmitting TR and receiving R terminals, is fundamental to ensure perfect agreement between encoder 102a and decoder 136a, and the most approximate reconstruction of signal $U(t)$ with 125 $\mu$sec sampling period, which is required by the encoder 102a and decoder 136a for the exact processing of the speech samples. Reconstructor 212 generates, in a very simple manner, a digital signal $X(t)$ preferably having 125 usec sampling period and values constantly equal and updated, with the same sampling period as $V(t)$. In the frequency domain, the spectrum of $X(t)$ is very closed to the spectrum of $U(t)$, but with components outside the band of $U(t)$. Digital low-pass filter 214 eliminates these out-of-band components, and, almost exactly reconstructs signal $U(t)$ with the preferred 125 usec sampling period. If desired, the low pass filter 214 may be completely eliminated; in this case, the sampling period of $V(t)$ must be reduced. Among the chief advantages of this type of modemodulation are the following: simplicity of implementation; high degree of immunity for transmission errors for signal $V(t)$; excellent reconstruction of signal $U(t)$; and minimum transmission rate.

3 STATE DIFFERENTIAL MODEMODULATION

Figure 8:
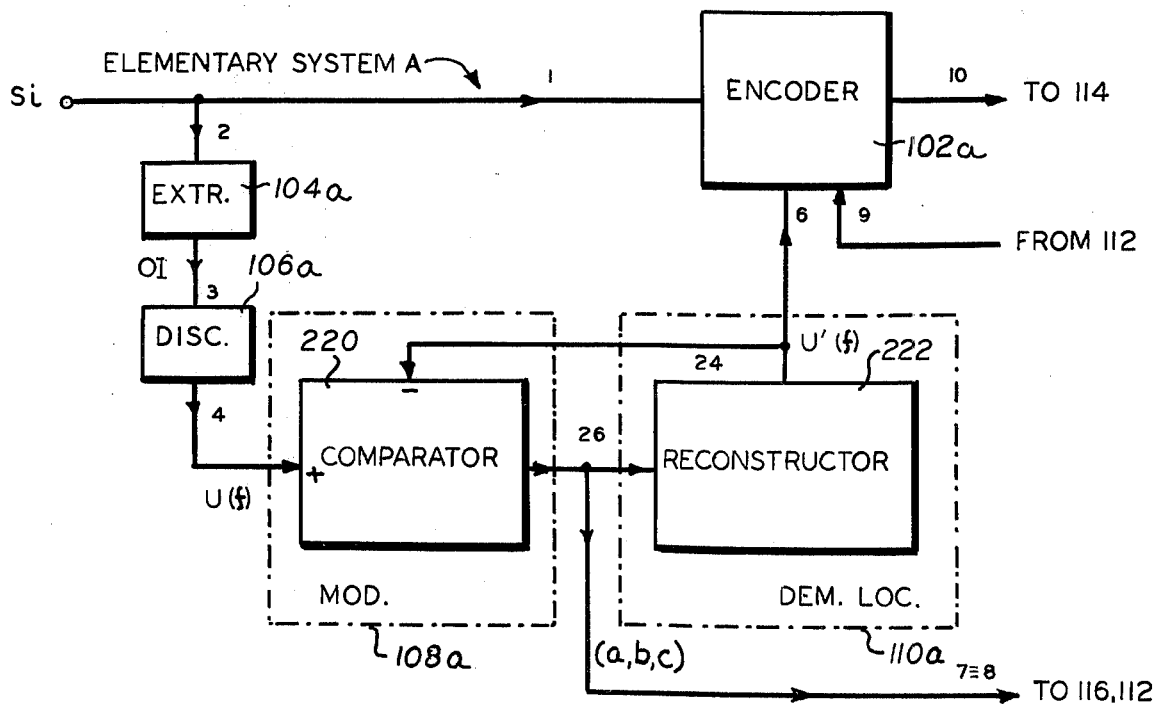
FIG. 8 is a more detailed block diagram of a typical elementary system A of FIG. 1 for another type of modemodulation.

The block diagram of an alternative embodiment of the modulator 108a and local demodulator 110a is shown in FIG. 8. Since the receiver portion demodulator 138a is identical to the local demodulator 110a; the former will not be described. Modulator 108a is composed of a conventional comparator 220 which receives signal $U(t)$ from discriminator 106a and supplies a 3 state logic output $(a,b,c)$. Local demodulator 110a consists of a reconstructor 222 which provides a digital signal $U'(t)$ [required by encoder 102a] very similar to $U(t)$. As in the embodiment of FIG. 7, the 3 state comparator 220 receives (on line 4) signal $U(t)$ from 106a and applies the 3 state signal $(a,b,c)$ to a reconstructor 222. The output from 102a and through line 24 to comparator 220. Comparator 220, working with a well determined period, compares the discriminator output signal $U(t)$ with the reconstructed signal $U'(t)$ supplied by 222 to encoder 102a. If the result of this comparison is more than zero, configuration $a$ is sent (through line 26) to combiner 116 and memory 112, and hence to the receiver R. If instead, the result is less than zero configuration $b$ is sent. If it is equal to zero, configuration $c$ is sent. In this embodiment reconstructor 222, which receives information $(a,b,c)$ and supplies signal $U'(t)$, corresponds to the local demodulator 110a. Obviously, at the receiving terminal there is a demodulator 138a identical to 110a, which in this case is equivalent to reconstructor 222 alone. In this case, too, there is perfect agreement between encoder 102a and decoder 136a, as they are both subjected to the same type of processing by the same signal. Reconstructor 222 preferably has the functions of generating a signal $U'(t)$ with preferably a 125 $\mu$sec sampling period and of updating signal $U'(t)$ with the same period as that of the information delivered by comparator 220. The updating criteron is the following:

$a$ — $U'(t)$ increases by one quantum step;

$b$ — $U'(t)$ decreases by one quantum step; and $c$ — $U'(t)$ remains unchanged.

To eliminate the influence of transmission errors it may be necessary to transmit an adjustment signal. Among the main advantages of this type of 3 state differential modemodulation are the following: ease of implementation; good reconstruction of $U(t)$; and good transmission rate.

It is to be understood that the above described embodiments of the invention are merely illustrative of the principle thereof and that numerous modifications and embodiments of the invention may be desired within the spirit and scope thereof.

What is claimed is

1. A system for reducing the redundancy of pulse code modulation encoded signals subjected to either compression or expansion comprising: means for transmitting and reducing redundancy of said signals, said transmitting means comprising encoding means for receiving an input speech signal having a variable modulation envelope signal associated with at least one particular talker and encoding said input signal with one of $m$ variable compression laws; second means connected to receive said input signal for extracting said envelope signal to provide an extracted signal; means connected to said extracting means for receiving said extracted signal and for discriminating said extracted signal and assigning it to one volume slot out of $n$ possible volume slots, said volume slot corresponding to the volume state of said envelope signal; digital modulation means for encoding said assigned volume slot envelope signal connected to said discriminating means output; means connected to said modulation means output for demodulating said assigned volume slot envelope signal for providing said variable compression law to said encoding means for accomplishing said encoding in accordance with said provided variable compression law and for providing a variable number of bits per sample that vary in accordance with the value of said specific input envelope signal and said volume state of all speech channels processed by said system, said encoding means output signal being a high speed digital signal, said digital modulation means further providing a low speed digital output signal for enabling subsequent reconstructing of said volume states, first combiner means connected in parallel to said digital modulation means output and said encoder means output for combining said high and low speed digital signals for transmitting said reduced redundancy pulse code modulation encoded signals.

2. A system in accordance with claim 1 further comprising means for receiving said transmitted reduced redundancy encoded signals, said receiving means comprising means for separating said high and low speed digital signals from each other; first means connected to said separating means for receiving said separated low speed digital signals and selecting said volume slot assigned to said envelope signal associated with said particular talker out of said $n$ possible volume slots; and second means connected to said separating means for receiving said separated high speed digital signals, reconstructing the volume states of all said speech channels processed by said system from said received envelope signals, and decoding said high speed digital signals in accordance with variable expansion laws which are determined by the actual value of said envelope signal of the speech channel being processed and by said volume states of all of said speech channels processed by said system for providing a decoded output signal congruent with said input signal to said encoder.

3. A system in accordance with claim 1 wherein at least said transmitting means includes a local memory means for locally storing said volume states of all said speech channels processed by said system.

4. A system in accordance with claim 1 wherein said input signal is selected from a group of signals consisting of analogue signals in the speech band; amplitude modulated (PAM) analogue signals resulting from the time division multiplexing of several speech channels; digital signals resulting from the individual PCM encoding of a speech channel; PCM digital signals resulting from the time division multiplexing and the PCM encoding of several speech channels.

5. A system in accordance with claim 1 wherein said variable compression laws are represented by a family of linear or logarithmic characteristics.

6. A system in accordance with claim 2 wherein the envelope wave modemodulation is effected through reconstruction of intermediate samples.

7. A system in accordance with claim 1 wherein said system operation occurs with a variable threshold.

8. A system in accordance with claim 1 wherein said envelope signal extractor means is comprised of a full wave rectifier means followed by a low pass filter means.

9. A system in accordance with claim 1 wherein said envelope signal extractor means is comprised of a multiplier means followed by a low pass filter means.

10. A system in accordance with claim 1 wherein said modulator of the envelope signal comprises an eraser of pulses which simultaneously feed said means and said means for demodulating.

11. A system in accordance with claim 10 wherein said local demodulator means comprises a reconstructor of intermediate samples and a low pass filter.

12. A system in accordance with claim 1 wherein said modulator means comprises a multi-state comparator and a means for demodulating which is a pulse reconstructor.

13. A system in accordance with claim 1 wherein said encoder means directly coupled to said means for demodulating.

14. A system in accordance with claim 7 further comprising a circuit for the automatic control of the variable muting threshold, said control circuit comprising a counter of active channels, a counter of idle channels, a differentiator, an integrator to which a regulator of time is associated and a compandor to which a regulator of a magnitude P related to the percentage of said time T, is associated, the output from said compandor controlling said discriminator of the envelope signal.

* * * * *